US008537493B2

(12) United States Patent
Kudo et al.

(10) Patent No.: US 8,537,493 B2
(45) Date of Patent: Sep. 17, 2013

(54) MAGNETIC HEAD FOR PERPENDICULAR RECORDING

(75) Inventors: Kazue Kudo, Odawara (JP); Hiromi Shiina, Hitachi (JP); Yohji Maruyama, Iruma (JP); Shouji Tokutake, Odawara (JP); Tetsuya Okai, Hadano (JP)

(73) Assignee: HGST Netherlands B.V., Amsterdam (NL)

( * ) Notice: Subject to any disclaimer, the term of this patent is extended or adjusted under 35 U.S.C. 154(b) by 35 days.

(21) Appl. No.: 12/965,277

(22) Filed: Dec. 10, 2010

(65) Prior Publication Data

US 2011/0141615 A1 Jun. 16, 2011

(30) Foreign Application Priority Data

Dec. 10, 2009 (JP) .................................. 2009-280575

(51) Int. Cl.
*G11B 5/23* (2006.01)
*G11B 5/127* (2006.01)

(52) U.S. Cl.
USPC ................................ 360/119.13; 360/125.15

(58) Field of Classification Search
USPC ............. 360/125.11, 125.15, 125.48, 125.53, 360/125.61, 125.66, 319–321, 121, 119.01–119.04, 360/119.11–119.13
See application file for complete search history.

(56) References Cited

U.S. PATENT DOCUMENTS

| | | | | |
|---|---|---|---|---|
| 4,811,142 A * | 3/1989 | Nakashima et al. | ....... | 360/234.7 |
| 8,238,056 B2 * | 8/2012 | Guan et al. | ............... | 360/119.02 |
| 2004/0264048 A1 | 12/2004 | Matono et al. | | |
| 2005/0141137 A1 * | 6/2005 | Okada et al. | .................. | 360/122 |
| 2005/0219743 A1 * | 10/2005 | Guan et al. | ..................... | 360/125 |
| 2006/0198050 A1 * | 9/2006 | Mochizuki et al. | ........... | 360/126 |
| 2007/0019327 A1 | 1/2007 | Maruyama et al. | | |
| 2007/0253107 A1 | 11/2007 | Mochizuki et al. | | |
| 2008/0019042 A1 * | 1/2008 | Toma et al. | .................... | 360/110 |
| 2008/0297953 A1 * | 12/2008 | Matono et al. | ................ | 360/319 |
| 2008/0316653 A1 * | 12/2008 | Sasaki et al. | ................... | 360/319 |
| 2009/0059426 A1 * | 3/2009 | Sasaki et al. | ............. | 360/125.02 |
| 2009/0059438 A1 * | 3/2009 | Anagawa et al. | ............. | 360/319 |
| 2009/0067098 A1 * | 3/2009 | Kim et al. | ..................... | 360/313 |

FOREIGN PATENT DOCUMENTS

| | | |
|---|---|---|
| JP | 2004/127480 A | 4/2004 |
| JP | 2004-310968 A | 11/2004 |
| JP | 2005-018851 A | 1/2005 |
| JP | 2005-190518 A | 7/2005 |
| JP | 2007-035082 A | 2/2007 |
| JP | 2007-294059 A | 11/2007 |
| JP | 2009-004068 A | 1/2009 |

* cited by examiner

*Primary Examiner* — Wayne Young
*Assistant Examiner* — Adam B Dravininkas
(74) *Attorney, Agent, or Firm* — Zilka-Kotab, PC

(57) ABSTRACT

According to one embodiment, a magnetic head for perpendicular recording includes a main pole, a first soft magnetic film disposed on a trailing side of the main pole, and a first nonmagnetic film interposed between the main pole and the first soft magnetic film. A thickness of the main pole is increased in a depth direction from an air bearing surface using an inclination, and a thickness of the first nonmagnetic film increases in the depth direction from the air bearing surface. In another embodiment, an angle from a horizontal plane of an upper surface of the first nonmagnetic film is greater than an angle from a horizontal plane of a lower surface of the first nonmagnetic film in contact with the main pole. Other heads, methods, and systems are described according to more embodiments.

20 Claims, 9 Drawing Sheets

MAGNETIC HEAD FOR PERPENDICULAR RECORDING

RELATED APPLICATIONS

The present application claims priority to a Japanese Patent Application filed Dec. 10, 2009 under Appl. No. 2009-280575, which is incorporated herein by reference.

FIELD OF THE INVENTION

The present invention relates to a magnetic recording head for perpendicular recording which may be installed in a magnetic disk device and used for data recording/reproduction.

BACKGROUND

Currently, there has been increasing demand for greater capacity and reduced sizes of magnetic disk devices which are used as external recording devices for information processors, such as computers. This has forced designers to attempt to increase the recording density in magnetic recording devices. Perpendicular recording systems, which make it easier to increase the recording density, have therefore become the most common systems, rather than the conventional longitudinal recording systems.

Perpendicular magnetic recording systems comprise at least a perpendicular recording medium having perpendicular anisotropy at the film surface, and a magnetic head for perpendicular recording which has the function of effectively applying a perpendicular magnetic field to the medium. The magnetic head for perpendicular recording comprises at least a coil conductor and a magnetic circuit which is interlinked therewith, and the magnetic circuit comprises a sub-pole and a main pole. A recording current, in which the polarity is set in accordance with electrical signals, flows to the coil conductor, and causes a recording field having a corresponding current polarity to be generated by the main pole. The main pole faces the recording medium and magnetizes the recording layer directly below. Changes in the polarity of the recording field are recorded as changes in the direction of magnetization of the recording medium. A soft magnetic underlayer is disposed below the recording layer which forms part of the perpendicular recording medium, and this has the function of returning the magnetic flux acting on the recording layer to the sub-pole. In order to improve the efficiency of this function, the sub-pole is designed with a greater surface area on the surface facing the recording medium than the main pole. This design allows magnetic information to be recorded onto the perpendicular recording medium as changes occur in the direction of magnetization.

In perpendicular recording, it is increasingly desired to narrow the magnetic transition width (which determines the recording density limit) which is present between adjacent regions of reverse magnetization in order to record high-density magnetic information (which is present in regions of different magnetization).

It is widely known that the magnetization transition width is affected by the magnetic field gradient of the recording head, and Japanese Unexamined Patent Appl. Pub. No. 2004-310968 discloses a magnetic head for perpendicular recording which has a soft magnetic film on the side surface in the track width direction of the main pole as a method for increasing the magnetic field gradient. Furthermore, Japanese Unexamined Patent Appl. Pub. No. 2005-18851 discloses a magnetic head for perpendicular recording in which the magnetic field gradient is made steeper by providing a soft magnetic film on the trailing side of the main pole. Furthermore, Japanese Unexamined Patent Appl. Pub. No. 2005-190518 and Japanese Unexamined Patent Appl. Pub. No. 2007-35082 propose a structure in which a magnetic shield film is provided that surrounds the periphery of the main pole. Japanese Unexamined Patent Appl. Pub. No. 2007-294059 discloses a structure in which the distance between the main pole and a side shield (the side gap length) is varied in the depth direction from the air bearing surface. Furthermore, Japanese Unexamined Patent Appl. Pub. No. 2004-127480 discloses a structure in which the shape of the side shield in the depth direction from the air bearing surface becomes larger moving away from the main pole. Inside the magnetic shield, the side of the main pole is positioned in order to prevent leakage of the magnetic field to adjacent tracks, and the upper side (trailing side) is positioned in order to increase the magnetic field gradient. In addition, Japanese Unexamined Patent Appl. Pub. No. 2009-4068 discloses a structure in which the trailing side of the main pole becomes thicker in the depth direction from the air bearing surface, and a thick nonmagnetic film is placed on the trailing side where the main pole has been thickened.

According to the prior art presented above, the side of the main pole can prevent leakage of the magnetic field to adjacent tracks when a soft magnetic film is provided around the main pole, and the upper side (trailing side) can increase the magnetic field gradient, and therefore narrowed track recording may be achieved. However, among other issues, there are problems in that the magnetic field intensity is reduced by a combination of the thickness of the soft magnetic film and the saturation magnetic flux density, and there are also problems in that data is recorded to adjacent tracks by the shield film effectively overwriting already recorded information, and these problems are an obstacle to narrower track recording.

Therefore, it would be beneficial to have a magnetic head which can overcome these deficiencies while still providing an increase to the intensity of the magnetic field and suppresses writing to adjacent tracks.

SUMMARY

According to one embodiment, a magnetic head for perpendicular recording includes a main pole, a first soft magnetic film disposed on a trailing side of the main pole, and a first nonmagnetic film interposed between the main pole and the first soft magnetic film. A thickness of the main pole is increased in a depth direction from an air bearing surface using an inclination, and a thickness of the first nonmagnetic film increases in the depth direction from the air bearing surface.

In another embodiment, a magnetic head for perpendicular recording includes a main pole, a first soft magnetic film disposed on a trailing side of the main pole, and a first nonmagnetic film interposed between the main pole and the first soft magnetic film. A thickness of the main pole is increased in a depth direction from an air bearing surface using an inclination, and an angle from a horizontal plane of an upper surface of the first nonmagnetic film is greater than an angle from a horizontal plane of a lower surface of the first nonmagnetic film in contact with the main pole.

According to another embodiment, a magnetic head for perpendicular recording includes a main pole, a first soft magnetic film disposed on a trailing side of the main pole, and a first nonmagnetic film interposed between the main pole and the first soft magnetic film, wherein a thickness of the first nonmagnetic film increases in a depth direction from an air bearing surface.

Any of these embodiments may be implemented in a magnetic data storage system such as a disk drive system, which may include a magnetic head, a drive mechanism for passing a magnetic storage medium (e.g., hard disk) over the head, and a control unit electrically coupled to the head for controlling operation of the head.

Other aspects and advantages of the present invention will become apparent from the following detailed description, which, when taken in conjunction with the drawings, illustrate by way of example the principles of the invention.

DETAILED DESCRIPTION

Figure 1:
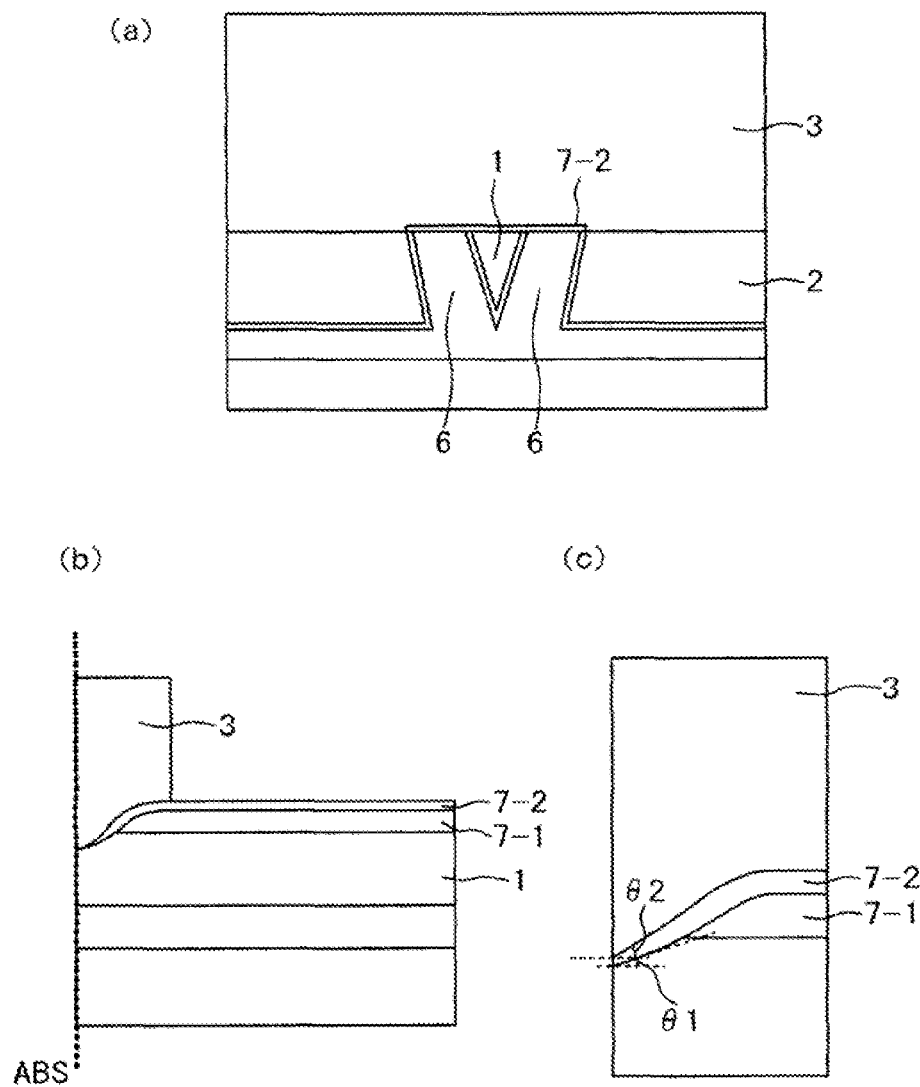
FIG. 1 shows a structure in a region of the main pole of a magnetic head for perpendicular recording in accordance with Exemplary Embodiment 1.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

According to a general embodiment, a magnetic head for perpendicular recording includes a main pole, a first soft magnetic film disposed on a trailing side of the main pole, and a first nonmagnetic film interposed between the main pole and the first soft magnetic film. A thickness of the main pole is increased in a depth direction from an air bearing surface using an inclination, and a thickness of the first nonmagnetic film increases in the depth direction from the air bearing surface.

In another general embodiment, a magnetic head for perpendicular recording includes a main pole, a first soft magnetic film disposed on a trailing side of the main pole, and a first nonmagnetic film interposed between the main pole and the first soft magnetic film. A thickness of the main pole is increased in a depth direction from an air bearing surface using an inclination, and an angle from a horizontal plane of an upper surface of the first nonmagnetic film is greater than an angle from a horizontal plane of a lower surface of the first nonmagnetic film in contact with the main pole.

According to another general embodiment, a magnetic head for perpendicular recording includes a main pole, a first soft magnetic film disposed on a trailing side of the main pole, and a first nonmagnetic film interposed between the main pole and the first soft magnetic film, wherein a thickness of the first nonmagnetic film increases in a depth direction from an air bearing surface.

Any of the general embodiments may be implemented in a magnetic data storage system which includes at least one magnetic head, a magnetic medium, a drive mechanism for passing the magnetic medium over the at least one magnetic head, and a controller electrically coupled to the at least one magnetic head for controlling operation of the at least one magnetic head.

In order to resolve the problems described relating to the prior art, a technology is presented which makes it possible to increase the intensity of the magnetic field and to suppress writing to adjacent tracks by using a nonmagnetic film which comprises a magnetic gap that is placed between the main pole and the soft magnetic film which is disposed on the trailing side of the main pole. Also, the thickness of the nonmagnetic film in the depth direction from the air bearing surface is controlled.

In one embodiment, a magnetic head for perpendicular recording includes a main pole, a first soft magnetic film disposed on a trailing side of the main pole, and a first nonmagnetic film interposed between the main pole and the first soft magnetic film. A thickness of the main pole is increased in a depth direction from an air bearing surface using an inclination, and a thickness of the first nonmagnetic film increases in the depth direction from the air bearing surface.

In this case, the angle of inclination of the taper of the first nonmagnetic film may be greater than about 5° and less than about 60°. If it is less than about 5°, the distance between the main pole and the soft magnetic film which is disposed on the trailing side of the main pole becomes narrower (e.g., no more than about 8.7 nm at a position about 100 nm from the air bearing surface), and the functionality of a magnetic gap is not achieved. Furthermore, controlling this taper to about 5° or less is difficult in terms of processing, given current levels of precision. If the taper is greater than about 60°, the soft magnetic film disposed on the trailing side of the main pole becomes saturated, and therefore the functionality as a shield is not achieved. In other words, it is not possible to prevent writing to adjacent tracks.

The magnetic head for perpendicular recording according to the above embodiment is also effective when the thickness of the main pole does not increase in the depth direction from the air bearing surface, or with a structure which does not have a soft magnetic film disposed on both sides in the track width direction of the main pole with a nonmagnetic film interposed.

In addition, it is possible to increase the intensity of the magnetic field by using a nonmagnetic film which constitutes a magnetic gap that is placed between the main pole and the soft magnetic film which is disposed on both sides in the track width direction of the main pole, and controlling the thickness of the nonmagnetic film in the depth direction from the air bearing surface, according to one embodiment.

That is to say, a magnetic head for perpendicular recording includes: a main pole, a first soft magnetic film which is disposed on the trailing side of the main pole with a first nonmagnetic film interposed, and a second soft magnetic film disposed on both sides in the track width direction of the main pole with a second nonmagnetic film interposed. A thickness of the main pole is increased in the depth direction from the air bearing surface by using an inclination, the first nonmagnetic film provided at the inclined part on the upper surface of the main pole becomes thicker in the depth direction from the air bearing surface, and the thickness of the second nonmagnetic film in the track width direction increases in the depth direction from the air bearing surface. The magnetic head for perpendicular recording according to this embodiment is also effective with a structure in which the thickness of the main pole does not increase in the depth direction from the air bearing surface.

According to one embodiment, it is possible to provide a magnetic head for perpendicular recording in which the magnetic field intensity is increased and writing to adjacent tracks is suppressed.

A magnetic head for perpendicular recording and a production method therefor, in accordance with one embodiment, is described below with reference to the figures.

FIG. 1 shows a structure in a region of the main pole of a magnetic head for perpendicular recording in accordance with Exemplary Embodiment 1. View (a) is a view seen from the air bearing surface, View (b) is a view in cross section when the track part has been cut in the direction perpendicular to the air bearing surface, and View (c) is an enlargement of View (b). It should be noted that View (b) and View (c) show the situation during production, and a magnetic head for perpendicular recording is obtained by grinding the air bearing surface (ABS) side as far as the air bearing surface indicated by the broken line in the figures.

Referring again to FIG. 1, the shape of a main pole 1 at the air bearing surface is an inverted trapezoid or triangular shape wherein the length in the track width direction on the trailing side is greater than the length in the track width direction on the leading side, according to one embodiment. A soft magnetic film 3 is formed on the trailing side of the main pole 1 with a nonmagnetic film 7-1 and a nonmagnetic film 7-2 comprising a magnetic gap lying therebetween. A soft magnetic film 2 is formed on both sides in the track width direction of the main pole 1 with a nonmagnetic film 6 interposed. The soft magnetic film 3 is formed on top of a soft magnetic underfilm (not depicted) which is formed on top of the magnetic gap 7-2. The nonmagnetic film 7-1 is formed at a position set back from the air bearing surface, and has an inclined part which is contiguous with an inclined part of the main pole 1, and the thickness of the nonmagnetic film 7-2 increases in a sloping shape in the depth direction from the air bearing surface. The soft magnetic film 2 and the soft magnetic film 3 act as magnetic shields.

As shown in FIG. 1, View (b) and View (c), the magnetic gap 7-2 which is provided on the trailing side of the main pole 1 comprises a lower surface which is formed with an angle θ1 along the inclination of the main pole 1, and an upper surface which is formed with an angle θ2 which is greater than the angle θ1. Here, the angles θ1, θ2 are angles from the horizontal plane. This means that the magnetic gap 7-2 is formed in such a way as to become greater in thickness in a sloping shape in the depth direction from the air bearing surface.

Figure 2:
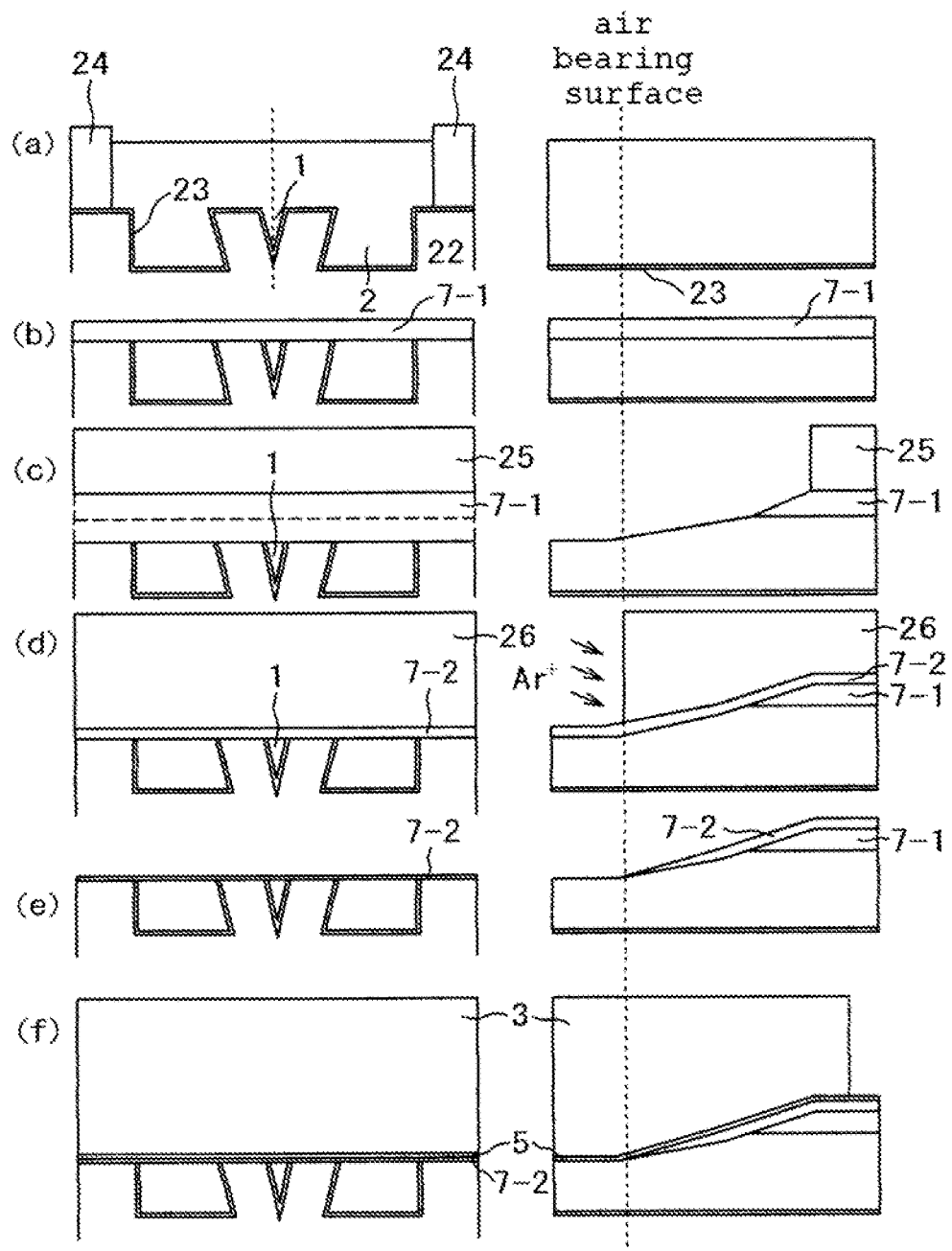
FIG. 2 is a process flow diagram showing a process for producing a magnetic head for perpendicular recording in accordance with Exemplary Embodiment 1.

FIG. 2 is a process flow diagram showing a process for producing a magnetic head for perpendicular recording in accordance with Exemplary Embodiment 1. Each view of this figure shows a view from the direction of the air bearing surface (left) and a cross section in the center of the main pole in the depth direction from the air bearing surface (right). First of all, as shown in View (a), a nonmagnetic film 23 is sputtered to several tens of nm in order to adjust the track width and to serve as a plated underfilm; this film is sputtered in a groove 22 which is formed in order to form the main pole 1 and the soft magnetic film 2. A resist 24 is then patterned and the main pole 1 and soft magnetic film 2 are plated. In this process, the main pole 1 and the soft magnetic film 2 are plated in one operation if they are made of the same material. If the two are made of different materials, the main pole 1 is plated first, and then the soft magnetic film 2 is plated, in one approach. After the resist has been removed, CMP is carried out, as shown in View (b), in order to adjust the film thickness, in one approach. The nonmagnetic film 7-1 is then formed over the whole surface by sputtering, and a resist pattern 25 is placed at the required position, as shown in View (c), in one approach. The nonmagnetic film 7-1 and the main pole 1 are then subjected to Ar ion milling in order to form the inclination on the upper part of the main pole. As shown in View (d), in one approach, the magnetic gap film 7-2 is then formed, after which a resist pattern 26 is once again formed, and the magnetic gap 7-2 is subjected to Ar ion milling. The thickness of the magnetic gap which has been formed in this way increases in a sloping shape in the depth direction from the air bearing surface, as shown in View (e), in one approach. A plated underfilm 5 is then sputtered in order to form the soft magnetic film 3 on the trailing side of the main pole 1, as shown in View (f), in one approach.

The shape of the air bearing surface of the head which has been formed in this way is as shown in FIG. 1, View (a), and the cross-sectional shape thereof in the depth direction from the air bearing surface is as shown in View (b) and View (c), in one approach. Here, the point x where the magnetic gap film 7-2 starts to become thicker in the depth direction is preferably such that $0 \leq x \leq 100$ nm, when the air bearing surface is taken as 0.

Figure 3:
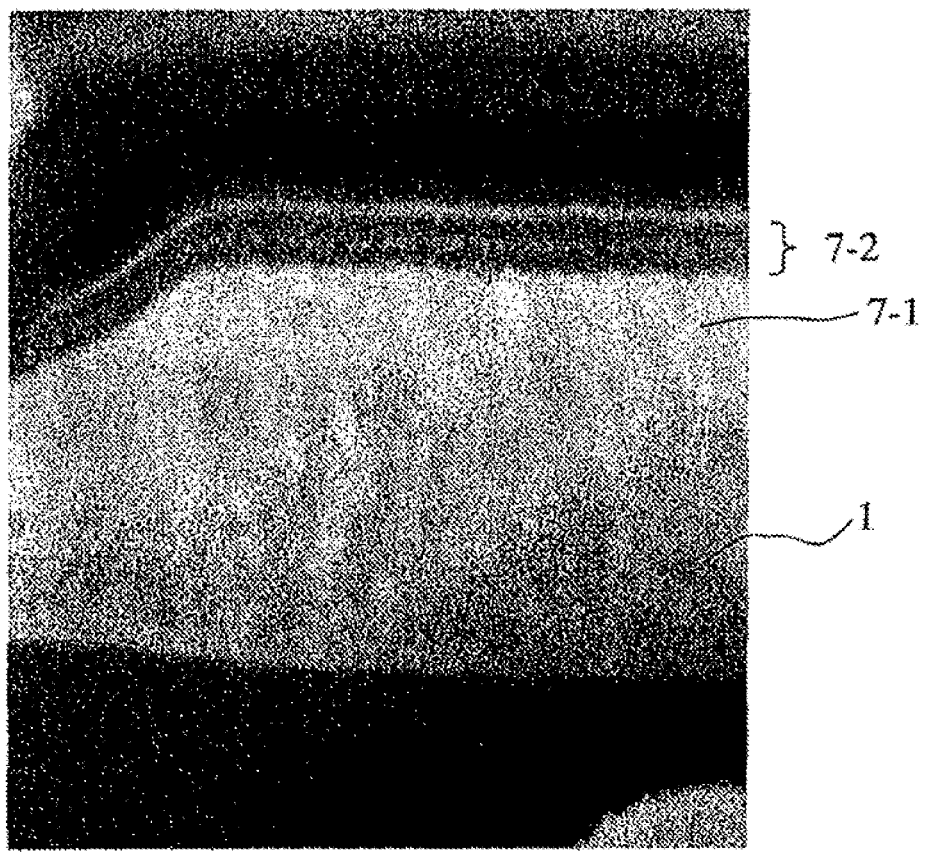
FIG. 3 is an FIB cross-sectional photograph of an element during a process for producing a magnetic head for perpendicular recording in accordance with Exemplary Embodiment 1.

FIG. 3 shows the results of FIB observation during a process for producing a head according to Exemplary Embodiment 1 (as shown in FIG. 2, View (d)). Referring again to FIG. 3, CoNiFe having high saturation magnetic flux density is used for the main pole 1, NiCr is used for the nonmagnetic film 7-1, and an alumina film is mainly used for the nonmagnetic film 7-2 which constitutes the magnetic gap, in one approach. It will be understood that it is possible to control the shape which is produced in the abovementioned range.

Figure 4:
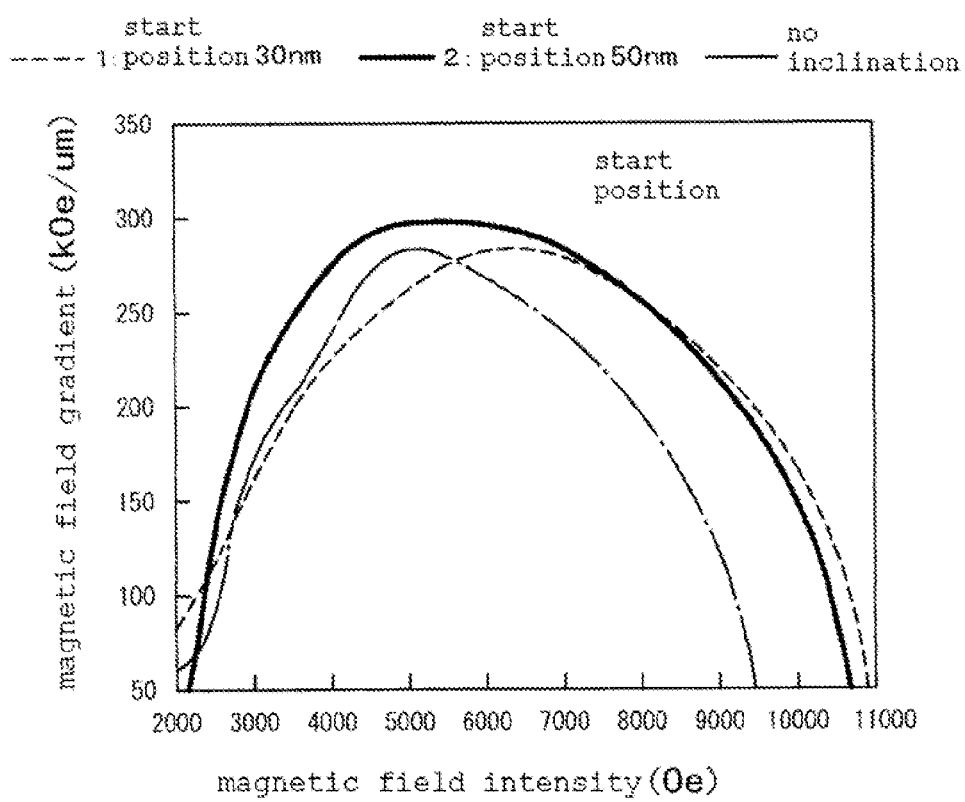
FIG. 4 shows a magnetic field intensity and magnetic field gradient of a magnetic head for perpendicular recording in accordance with Exemplary Embodiment 1.

FIG. 4 shows a relationship between the magnetic field intensity and the magnetic field gradient of the head produced in Exemplary Embodiment 1. The broken line 1 shows the case in which the point where the nonmagnetic film constituting the magnetic gap starts to become thicker is 30 nm from the air bearing surface, the solid line 2 shows the case of 50 nm, and the dotted chain line shows the case where the thickness of the magnetic gap does not change, in one approach. It can be seen from these results that there is virtually no difference when the point where the magnetic gap starts to become thicker is at 30 nm and 50 nm, and in the region of current recording field density of 8000 Oe, the magnetic field gradient increases by 50 kOe compared with a head in which the thickness of the magnetic gap does not change. The fact that the magnetic field gradient is greater means that the error rate can be improved and a high-performance magnetic head for perpendicular recording can be obtained, in one approach.

Figure 5:
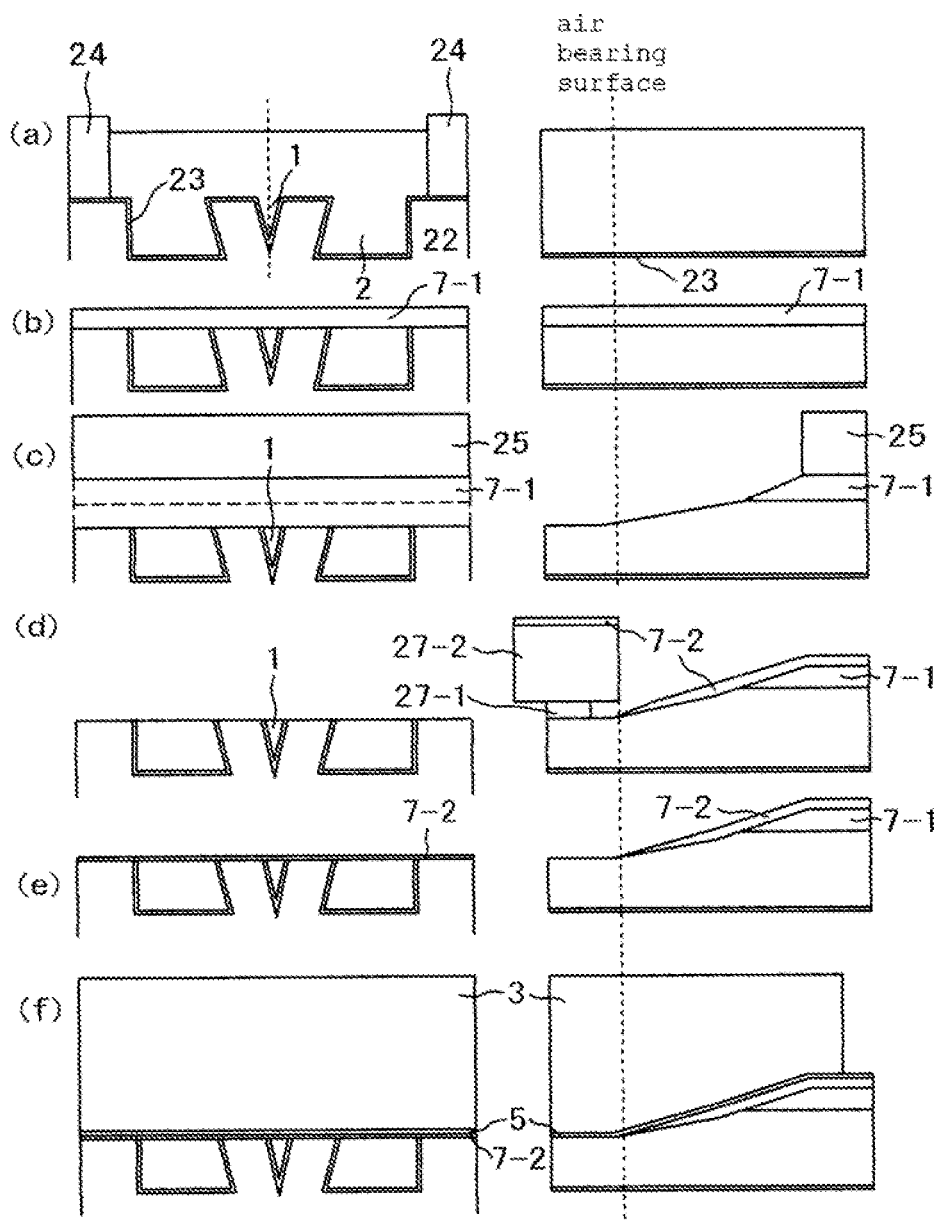
FIG. 5 is a process flow diagram showing another process for producing a magnetic head for perpendicular recording in accordance with Exemplary Embodiment 1.

FIG. 5 is another process flow diagram showing a process for producing a magnetic head for perpendicular recording in accordance with Exemplary Embodiment 1. The process up to the formation of the inclination on the upper part of the main pole is the same as in the process flow shown in FIG. 2, in one approach. Referring again to FIG. 5, after this, two layers of resist patterns 27-1, 27-2 are formed in advance, as shown in FIG. 5, View (d). The resist pattern 27-1 is smaller than the resist pattern 27-2. With these resist patterns present, when the nonmagnetic film 7-2 which constitutes the magnetic gap is formed and the resists are removed by lift-off, the nonmagnetic film 7-2 is thinner in the area shadowed by the resist pattern 27-2, and it is possible to obtain a shape in which the thickness increases in a sloping shape in the depth direction from the air bearing surface. A further nonmagnetic film may be formed after this in order to adjust the magnetic gap, in one approach.

Figure 6:
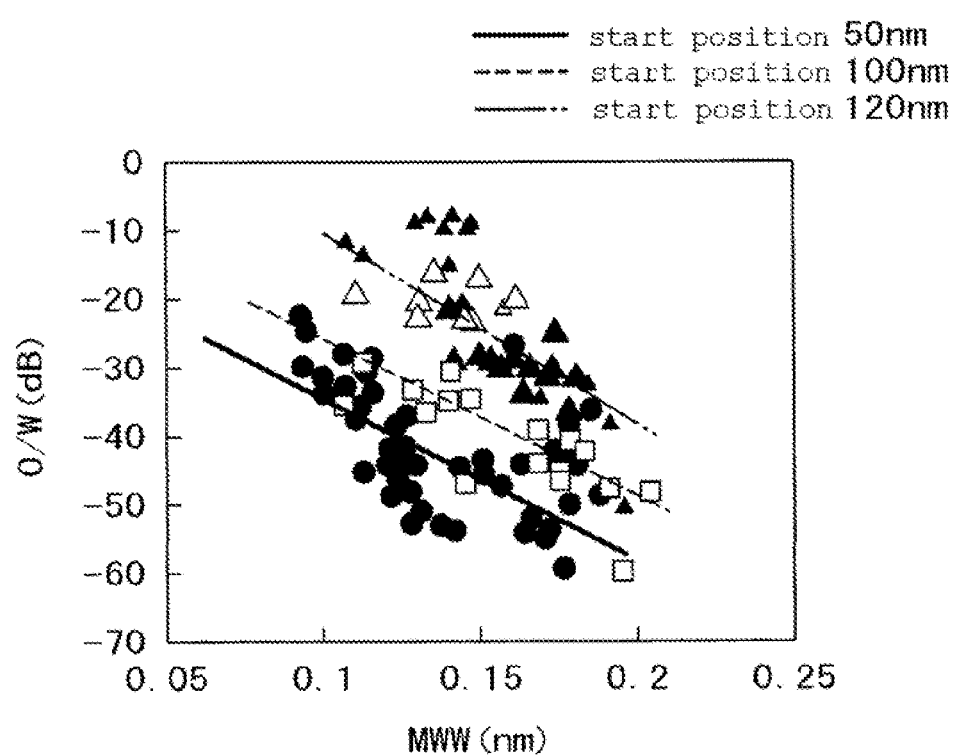
FIG. 6 shows recording characteristics (overwrite) of a magnetic head for perpendicular recording in accordance with Exemplary Embodiment 1.

FIG. 6 shows a comparison of the overwrite (O/W) characteristics between the head according to Exemplary Embodiment 1 and a head in which the point where the magnetic gap starts to become thicker is about 100 nm and about 120 nm away from the air bearing surface. The horizontal axis represents the width (MWW) of the tracks recorded on the medium. It can be seen from these results that the starting point for increased thickness of the nonmagnetic film which is interposed between the main pole and the soft magnetic film 3 disposed on the trailing side of the main pole has a great effect on the recording performance. This is because the magnetic field emitted by the main pole is taken in first by the soft magnetic film 3 on the depth side from the air bearing surface, and the distance of the main pole 1 and the soft magnetic film 3 from the air bearing surface should be increased in order to improve overwriting. However; if the point where the nonmagnetic film starts to become thicker is more than 120 nm from the air bearing surface, there is a sharp deterioration in overwriting. If ±15 nm is considered as the level of precision in current processes, the starting point is preferably no more than about 100 nm from the air bearing surface, in one approach.

It should be noted that it is possible to omit the soft magnetic film 2 and the non magnetic film 7-1 from the configuration of Exemplary Embodiment 1 described above, in one approach.

Figure 7:
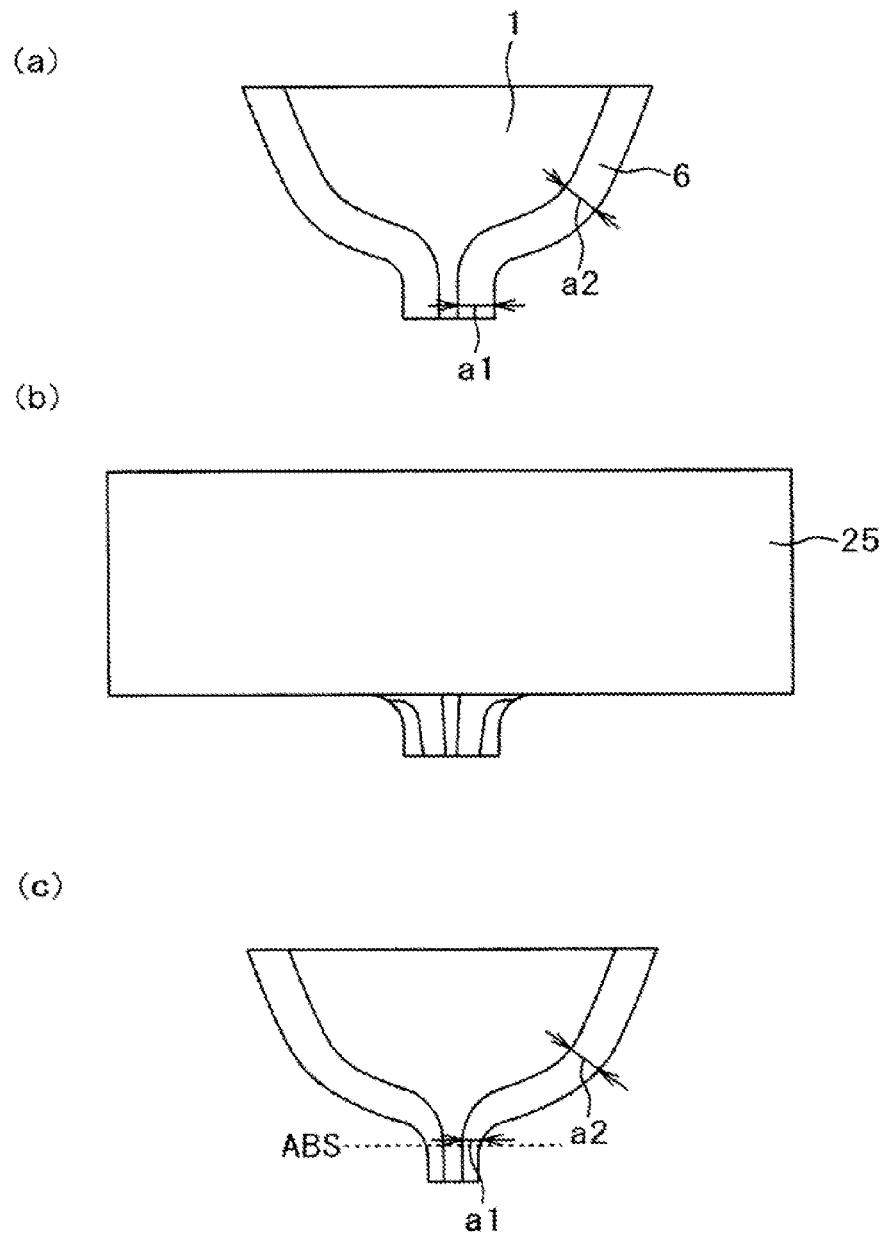
FIG. 7 is a process flow diagram showing a process for producing a magnetic head for perpendicular recording in accordance with Exemplary Embodiment 2.

FIG. 7 is a view from above of a region of a main pole in a magnetic head for perpendicular recording in accordance with Exemplary Embodiment 2. The magnetic head for perpendicular recording in accordance with Exemplary Embodiment 2 has the same configuration as that of Exemplary Embodiment 1, in one approach. The difference with Exemplary Embodiment 1 lies in the fact that the thickness of the nonmagnetic film 6 in the track width direction increases in the depth direction from the air bearing surface. The main pole is first of all formed to a desired shape, in one approach. After this, a nonmagnetic film 6 having good throwing power is formed. In this case, the thickness of the nonmagnetic film 6 is the same in both the region of the air bearing surface (a1) and further toward the depth side from the air bearing surface (a2), i.e. a1=a2, as shown in View (a). The depth side from the air bearing surface is then protected by a resist 25, as shown in View (b), and the track region is subjected to Ar ion milling. In this process, the milling is carried out continuously between the left and right of the tracks. After the milling has been carried out in this way, the resist is removed, and the thickness of the nonmagnetic film 6 in the region of the air bearing surface is less than the thickness on the depth side from the air bearing surface, as shown in View (c), i.e. a1<a2. By adopting this configuration it is possible to further improve the magnetic field intensity, in one approach.

Figure 8:
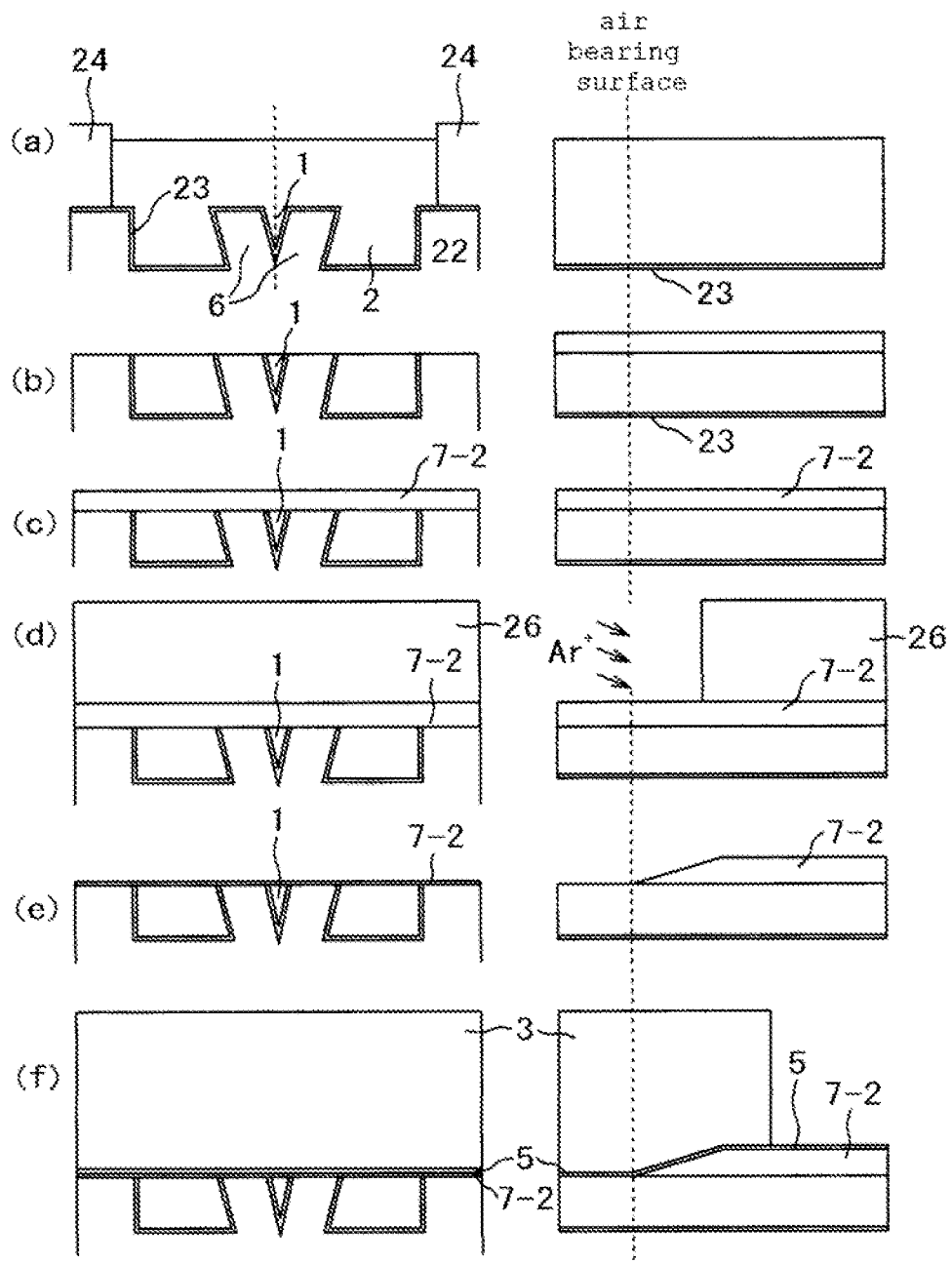
FIG. 8 is a process flow diagram showing a process for producing a magnetic head for perpendicular recording in accordance with Exemplary Embodiment 3.

FIG. 8 is a process flow diagram showing a process for producing a magnetic head for perpendicular recording in accordance with Exemplary Embodiment 3. As shown in View (a), the thickness of the nonmagnetic film 6 disposed in the track width direction of the main pole shown in Exemplary Embodiment 2 is formed in such a way that the thickness on the depth side is greater than the thickness at the air bearing surface, after which the soft magnetic film 2 is formed on both sides in the track width direction of the main pole 1 with the nonmagnetic film 6 interposed, in one approach. Next, as shown in View (b), CMP is carried out in order to adjust the film thickness, after which the nonmagnetic film 7-2 is formed over the whole surface, as shown in View (c), in one approach. Next, as shown in View (d), in one approach, a resist pattern 26 is provided in the desired position, the nonmagnetic film 7-2 is subjected to Ar ion milling, and an inclination is formed at the tip end of the nonmagnetic film 7-2 as shown in View (e), in one approach. The plated underfilm 5 is then sputtered, as shown in View (f), in one approach, in order to form the soft magnetic film 3 on the trailing side of the main pole 1. Even if the structure does not have an inclination on the upper part of the main pole, as in this exemplary embodiment, it is still possible to improve the magnetic field intensity by adopting a structure in which there is a difference in thickness of the nonmagnetic film on both sides in the track width direction of the main pole 1 and the nonmagnetic film on the trailing side, and writing to adjacent tracks can be suppressed, in one approach.

Figure 9:
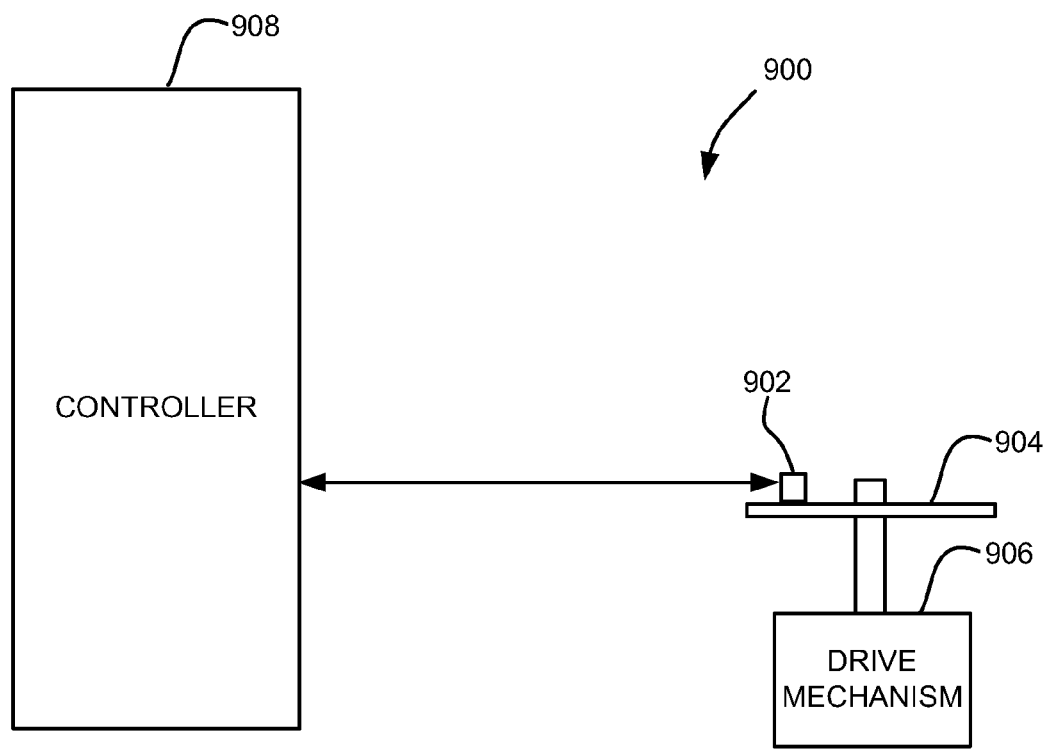
FIG. 9 is a system diagram according to one embodiment.

The magnetic head for perpendicular recording in accordance with the present invention may be utilized in external recording devices such as magnetic disk devices, in various embodiments. Referring to FIG. 9, such magnetic storage systems 900 may include at least one magnetic head 902 as described in any of the previous embodiments, a magnetic medium 904, a drive mechanism 906 for passing the magnetic medium over the at least one magnetic head, and a controller 908 electrically coupled to the at least one magnetic head for controlling operation of the at least one magnetic head.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic head for perpendicular recording, comprising:
   a main pole;
   a first soft magnetic film disposed on a trailing side of the main pole; and
   a first nonmagnetic film interposed between the main pole and the first soft magnetic film;
   a second soft magnetic film disposed on both sides in a track width direction of the main pole; and
   a second nonmagnetic film interposed between the main pole and the second soft magnetic film,
   wherein a thickness of the main pole is increased in a depth direction from an air bearing surface using an inclination,
   wherein the thickness of the main pole begins increasing at the air bearing surface,
   wherein a thickness of the first nonmagnetic film increases along the depth direction starting from the air bearing surface, and
   wherein a thickness of the second nonmagnetic film in the track width direction increases in the depth direction from the air bearing surface starting at the air bearing surface.

2. The magnetic head for perpendicular recording as recited in claim 1, wherein a distance between the main pole and the first soft magnetic film increases along the depth direction starting from the air bearing surface.

3. The magnetic head for perpendicular recording as recited in claim 1,
wherein the second soft magnetic film is a magnetic shield, and
wherein the second nonmagnetic film lies in a common plane with the main pole, the common plane being parallel with a plane of deposition of the main pole.

4. The magnetic head for perpendicular recording as recited in claim 1, wherein a position (x) where the first nonmagnetic film begins to thicken is such that $0\,nm \leq x \leq 100$ nm when the air bearing surface is represented as 0 nm, wherein the first nonmagnetic film is interposed between the main pole and the first soft magnetic film at the air bearing surface, and wherein the first nonmagnetic film is a single film layer.

5. A magnetic data storage system, comprising:
at least one magnetic head as recited in claim 1;
a magnetic medium;
a drive mechanism for passing the magnetic medium over the at least one magnetic head; and
a controller electrically coupled to the at least one magnetic head for controlling operation of the at least one magnetic head.

6. The magnetic head for perpendicular recording as recited in claim 1, wherein the first nonmagnetic film is a magnetic shield and has a physical characteristic of being formed full film and undergoing ion milling to form the increase in thickness in the depth direction from the air bearing surface.

7. A magnetic head for perpendicular recording, comprising:
a main pole adapted for generating a recording field;
a first soft magnetic film disposed on a trailing side of the main pole;
a first nonmagnetic film interposed between the main pole and the first soft magnetic film;
a second soft magnetic film disposed on both sides in a track width direction of the main pole, the second soft magnetic film lying in a same plane as the main pole on both sides of the main pole; and
a second nonmagnetic film interposed between the main pole and the second soft magnetic film,
wherein a thickness of the main pole is increased in a depth direction from an air bearing surface using an inclination,
wherein a thickness of the second nonmagnetic film in the track width direction increases in the depth direction from the air bearing surface starting at the air bearing surface, and
wherein an angle from a horizontal plane of an upper surface of the first nonmagnetic film is greater than an angle from a horizontal plane of a lower surface of the first nonmagnetic film in contact with the main pole.

8. The magnetic head for perpendicular recording as recited in claim 7, wherein an angle of the upper surface of the first nonmagnetic film is greater than about 5° and less than about 60°.

9. The magnetic head for perpendicular recording as recited in claim 7, wherein a distance between the main pole and the first soft magnetic film increases along the depth direction starting from the air bearing surface.

10. The magnetic head for perpendicular recording as recited in claim 7, wherein the second nonmagnetic film is a magnetic shield.

11. The magnetic head for perpendicular recording as recited in claim 7, wherein a leading side surface of the main pole at the air bearing surface is perpendicular to the air bearing surface.

12. The magnetic head for perpendicular recording as recited in claim 7, wherein a distance between the main pole and the second soft magnetic film increases along the depth direction starting from the air bearing surface.

13. A magnetic data storage system, comprising:
at least one magnetic head as recited in claim 7;
a magnetic medium;
a drive mechanism for passing the magnetic medium over the at least one magnetic head; and
a controller electrically coupled to the at least one magnetic head for controlling operation of the at least one magnetic head.

14. A magnetic head for perpendicular recording, comprising:
a main pole;
a first soft magnetic film disposed on a trailing side of the main pole;
a first nonmagnetic film interposed between the main pole and the first soft magnetic film;
a second soft magnetic film disposed on both sides in a track width direction of the main pole; and
a second nonmagnetic film interposed between the main pole and the second soft magnetic film,
wherein a thickness of the second nonmagnetic film in the track width direction increases in the depth direction from the air bearing surface,
wherein a thickness of the first nonmagnetic film increases in a depth direction from an air bearing surface,
wherein the thickness of the first nonmagnetic film begins increasing at the air bearing surface,
wherein a thickness of the second nonmagnetic film in the track width direction increases in the depth direction from the air bearing surface starting at the air bearing surface.

15. The magnetic head for perpendicular recording as recited in claim 14, wherein the second nonmagnetic film is a magnetic shield, and wherein the second nonmagnetic film lies in a common plane with the main pole, the common plane being parallel with a plane of deposition of the main pole.

16. The magnetic head for perpendicular recording as recited in claim 14, wherein a thickness of the second nonmagnetic film in the track width direction increases in the depth direction from the air bearing surface.

17. The magnetic head for perpendicular recording as recited in claim 14, wherein a distance between the main pole and the second soft magnetic film increases in the depth direction from the air bearing surface starting at the air bearing surface.

18. The magnetic head for perpendicular recording as recited in claim 14, wherein a distance between the main pole and the first soft magnetic film increases in the depth direction from the air bearing surface.

19. The magnetic head for perpendicular recording as recited in claim 13, wherein a position (x) where the first nonmagnetic film begins to thicken is such that $0\,nm \leq x \leq 100$ nm when the air bearing surface is represented as 0 nm.

20. A magnetic data storage system, comprising:
at least one magnetic head as recited in claim 14;
a magnetic medium;

a drive mechanism for passing the magnetic medium over the at least one magnetic head; and a controller electrically coupled to the at least one magnetic head for controlling operation of the at least one magnetic head.

\* \* \* \* \*